United States Patent
Lee et al.

(10) Patent No.: US 9,977,950 B2
(45) Date of Patent: May 22, 2018

(54) DECOY-BASED MATCHING SYSTEM FOR FACIAL RECOGNITION

(71) Applicant: INTEL CORPORATION, Santa Clara, CA (US)

(72) Inventors: Hyungsoo Lee, Seoul (KR); Yeongjae Cheon, Seoul (KR); Sumin Lee, Boston, MA (US); Minje Park, Seoul (KR)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/008,186

(22) Filed: Jan. 27, 2016

(65) Prior Publication Data

US 2017/0213074 A1   Jul. 27, 2017

(51) Int. Cl.
  *G06K 9/00*    (2006.01)
  *G06K 9/62*    (2006.01)
  *G06F 17/30*   (2006.01)

(52) U.S. Cl.
  CPC ... *G06K 9/00288* (2013.01); *G06F 17/30256* (2013.01); *G06K 9/00281* (2013.01); *G06K 9/6215* (2013.01)

(58) Field of Classification Search
  CPC .......... G06K 9/00288; G06K 9/00281; G06K 9/6215; G06F 17/30256
  See application file for complete search history.

(56) References Cited

U.S. PATENT DOCUMENTS

| | | | | |
|---|---|---|---|---|
| 5,164,992 A | * | 11/1992 | Turk | A61B 5/1176 375/E7.026 |
| 5,412,738 A | * | 5/1995 | Brunelli | A61B 5/1176 382/115 |
| 6,636,619 B1 | * | 10/2003 | Zhang | G06K 9/00221 382/118 |
| 7,130,454 B1 | * | 10/2006 | Berube | G06K 9/00234 382/118 |
| 8,861,804 B1 | * | 10/2014 | Johnson | G06K 9/00221 382/118 |

(Continued)

OTHER PUBLICATIONS

International Search Report and Written Opinion for International PCT Application No. PCT/US2016/065884, dated Feb. 20, 2017, 14 pages.

(Continued)

*Primary Examiner* — Amara Abdi
(74) *Attorney, Agent, or Firm* — Finch & Maloney PLLC

(57) ABSTRACT

Techniques are provided for facial recognition using decoy-based matching of facial image features. An example method may include comparing extracted facial features of an input image, provided for recognition, to facial features of each of one or more images in a gallery of known faces, to select a closest gallery image. The method may also include calculating a first distance between the input image and the selected gallery image. The method may further include comparing the facial features of the input image to facial features of each of one or more images in a set of decoy faces, to select a closest decoy image and calculating a second distance between the input image and the selected decoy image. The method may further include recognizing a match between the input image and the selected gallery image based on a comparison of the first distance and the second distance.

15 Claims, 9 Drawing Sheets

(56) References Cited

U.S. PATENT DOCUMENTS

| | | | |
|---|---|---|---|
| 2006/0110014 A1 | 5/2006 | Philomin | |
| 2008/0304716 A1* | 12/2008 | Hirose | G06K 9/00201 382/118 |
| 2010/0067745 A1* | 3/2010 | Kovtun | G06K 9/00711 382/106 |
| 2010/0287053 A1* | 11/2010 | Ganong | G06F 17/30247 705/14.66 |
| 2011/0299743 A1* | 12/2011 | Ke | G06K 9/00281 382/118 |
| 2012/0014560 A1* | 1/2012 | Obrador | G06K 9/00677 382/103 |
| 2012/0027270 A1* | 2/2012 | Kyyko | G06K 9/00208 382/118 |
| 2012/0250952 A1* | 10/2012 | Kveton | G06K 9/00221 382/118 |
| 2013/0051632 A1 | 2/2013 | Tsai | |
| 2013/0329059 A1 | 12/2013 | Uchikoshi | |
| 2014/0375886 A1* | 12/2014 | Galleguillos | G06F 17/30793 348/571 |

OTHER PUBLICATIONS

T. Berg and P. N. Belhumeur, "Tom-vs-Pete Classifiers and. Identity-Preserving Alignment for Face Verification", British Machine Vision Conference, 2012, 11 pages.

Wolf, L. et al., "Face Recognition in Unconstrained Videos with Matched Background Similarity", IEEE Conf. on Computer Vision and Pattern Recognition (CVPR), 2011, 6 pages.

Yin, Q. et al., "An Associate-Predict Model for Face Recognition", IEEE Conf. on Computer Vision and Pattern Recognition (CVPR), 2011, 8 pages.

* cited by examiner

DECOY-BASED MATCHING SYSTEM FOR FACIAL RECOGNITION

BACKGROUND

Facial recognition systems are increasingly used in a variety of applications. For example, facial recognition may be employed as part of a security check to either permit or deny access by a person to some resource, data or physical entry to a secured location. As another example, facial recognition is often used to identify people in photographs as an aid to organizing collections of photos or quickly identifying photos of interest.

Existing techniques for facial recognition generally provide satisfactory results under controlled conditions. In a real world environment, however, facial appearance can vary dramatically due to changes in expression, illumination conditions, orientation/pose, etc. Such variations can significantly degrade recognition performance. Some approaches to address this problem require an on-line learning phase, while other approaches require the generation of thousands of classifiers to recognize a single face. These techniques impose relatively large computational burdens which may not be suitable for real-time applications.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for facial recognition using decoy-based matching of facial image features. In accordance with an embodiment, extracted facial features from an input image, of a face to be recognized, are compared to facial features of faces from a gallery of known faces, to find a closest match to a known face. Additionally, however, the facial features of the input image are further compared to facial features of faces in a set of decoy faces to find a closest match to one of the decoy faces. The set of decoy faces provides a relatively wide and representative sampling of faces that are associated with people who are not in the gallery of known faces and should therefore not be recognized as a correct or valid match to the face of the input image. Distance metrics, based on the facial features, are computed between the input image and both the closest match from the gallery of known faces and the closest match from the set of decoy faces. A comparison of these distance metrics, relative to each other and relative to selected or otherwise predefined thresholds, may provide for improvement in the rate of correct matches and reduction in the rate of false matches. In some example cases, for instance, if a mathematically computed distance (D1) between input image and the closest match from the gallery of known faces is sufficiently smaller than a mathematically computed distance (D2) between the input image and the closest match from the set of decoy faces, then the input image and the closest match from the gallery can be considered to be the same person. In some embodiments, this match conclusion holds true even if D1 is larger than the predefined threshold value, as will be further described in greater detail below. Additionally, techniques are provided for generation of the set of decoy facial images, according to some embodiments.

The techniques described herein, for decoy-based matching, may provide for generally improved recognition performance over conventional recognition systems, while simultaneously providing increased efficiency relative to typical facial recognition systems that rely on computationally expensive learning algorithms and the generation of large numbers of classifiers. The decoy-based matching techniques provided herein can be implemented in hardware or software or a combination thereof, and may be adapted into any number of applications where facial recognition is desired.

Figure 1:
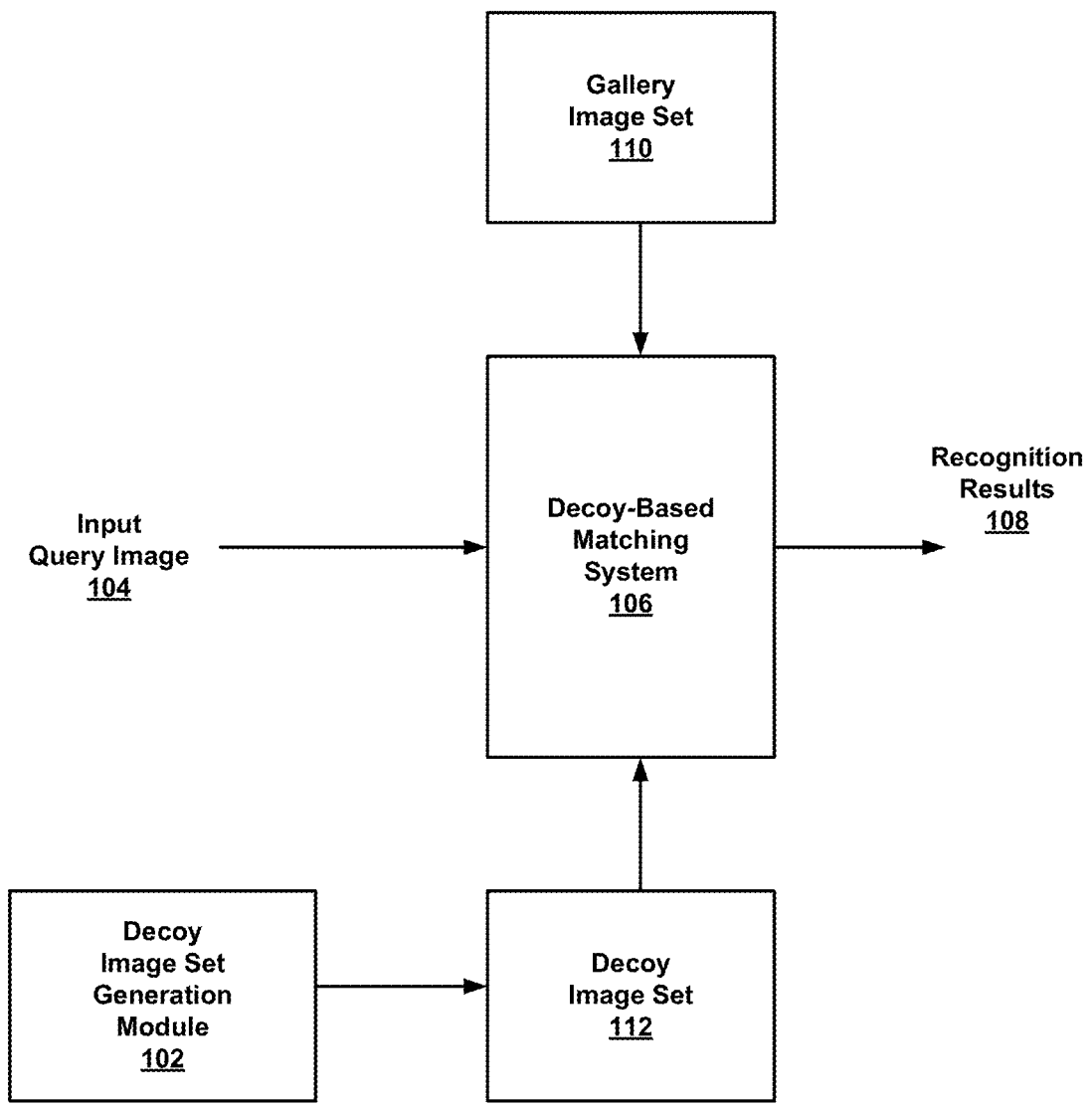
FIG. 1 is a top level block diagram of a decoy-based matching system, in accordance with certain of the embodiments disclosed herein.

FIG. 1 is a top level block diagram 100 of a decoy-based matching system, in accordance with certain of the embodiments disclosed herein. An input image (or query image) 104, which may include a face or facial image to be recognized, is presented to the decoy-based matching system 106 which is configured to generate recognition results 108. A gallery image set (or database) 110 is configured to store facial images and/or facial image features associated with known persons. In other words, the gallery image set includes the faces/features against which a potential recognition match 108 may be obtained for the input image face 104, by matching system 106. For example, in a security application, personnel who are authorized to access some resource may have their photos taken and stored in the gallery image set 110. Examples of facial image features may include, but are not limited to the relative position, size, shape, contours and/or texture, of facial components including the eyes, nose, mouth, cheekbones, jaw, etc. Of course facial image features may include any other features that could be useful for facial recognition.

The decoy image set (or database) 112 is configured to store facial images and/or facial image features associated with people who are not in the gallery of known faces and should therefore not be recognized as a correct or valid match to the face of the input image. These decoy images are provided to matching system 106 for comparison purposes to improve the rate of correct matches and reduce the rate of false matches, as will be described herein. The decoy image set generation module 102 may be configured to create the decoy image set 112, and will also be described further in connection with FIG. 6, below.

Figure 2:
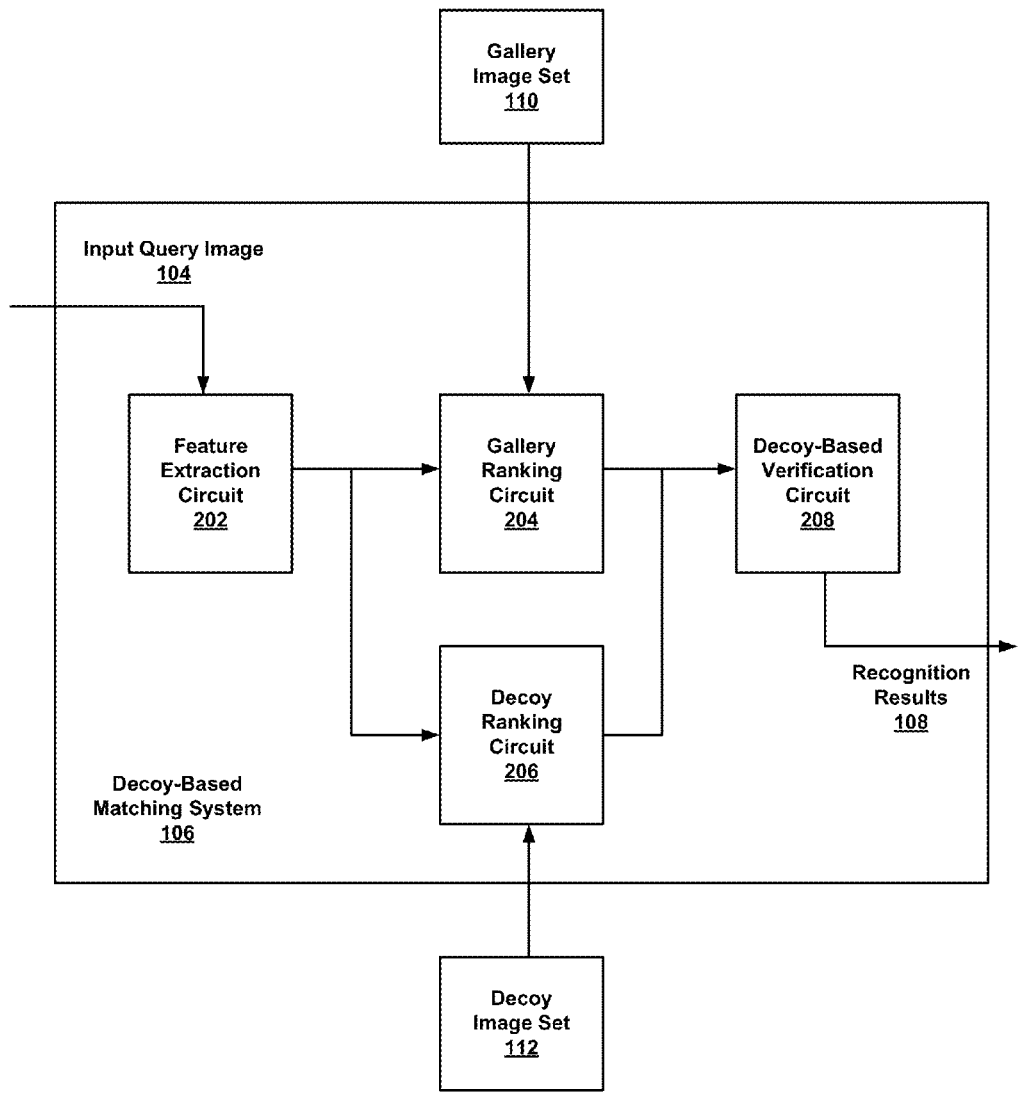
FIG. 2 is a more detailed block diagram of a decoy-based matching system, in accordance with certain of the embodiments disclosed herein.

FIG. 2 is a more detailed block diagram of a decoy-based matching system, in accordance with certain of the embodiments disclosed herein. The decoy-based matching system 106 is shown to include a feature extraction circuit 202, a gallery ranking circuit 204, a decoy ranking circuit 206 and a decoy-based verification circuit 208. Additionally, access to storage for the gallery image set 110 and the decoy image set 112 is provided. Note that the degree of modularity and integration of the system may vary from one embodiment to the next, and the example configuration shown is not intended to limit the present disclosure to the particular structure depicted. In other embodiments, for instance, each of the feature extraction circuit 202, gallery ranking circuit 204, decoy ranking circuit 206 and decoy-based verification circuit 208 can be integrated into a common module programmed or otherwise configured to carryout similar functionality. To this end, the number of functional modules may increase or decrease, depending on the desired degree of modularity. Numerous other variations and configurations will be apparent in light of this disclosure.

The feature extraction circuit 202 may be configured to extract or otherwise determine facial features associated with face included in the input query image 104. One example embodiment of the feature extraction circuit 202 is described below in connection with FIG. 3. In some embodiments, the feature extraction circuit 202 may also be employed to extract features from the facial images in the gallery image set and/or the decoy image set if those features were not previously provided. While feature extraction may be performed in real-time on input images 104, for example as they are presented to the system, extraction of the features of the gallery images and the decoy images may be performed as an off-line procedure (e.g., as an initialization or periodic update) prior to operation of the recognition system.

The gallery ranking circuit 204 may be configured to search for a closest match between the input image 104 and the gallery images of gallery image set 110, while the decoy ranking circuit 206 may be configured to search for a closest match between the input image 104 and the decoy images of decoy image set 112. The determination of a closest match may be based on a comparison of calculated distance metrics between the features associated with each image, as will be described in connection with FIGS. 4a and 4b.

The decoy-based verification circuit 208 may be configured to determine whether the closest match between the input image and one of the gallery images is a valid. This determination is based on the calculated distance metrics between the input image, the closest gallery image and the closest decoy image, as will be described in connection with FIG. 5.

Figure 3:
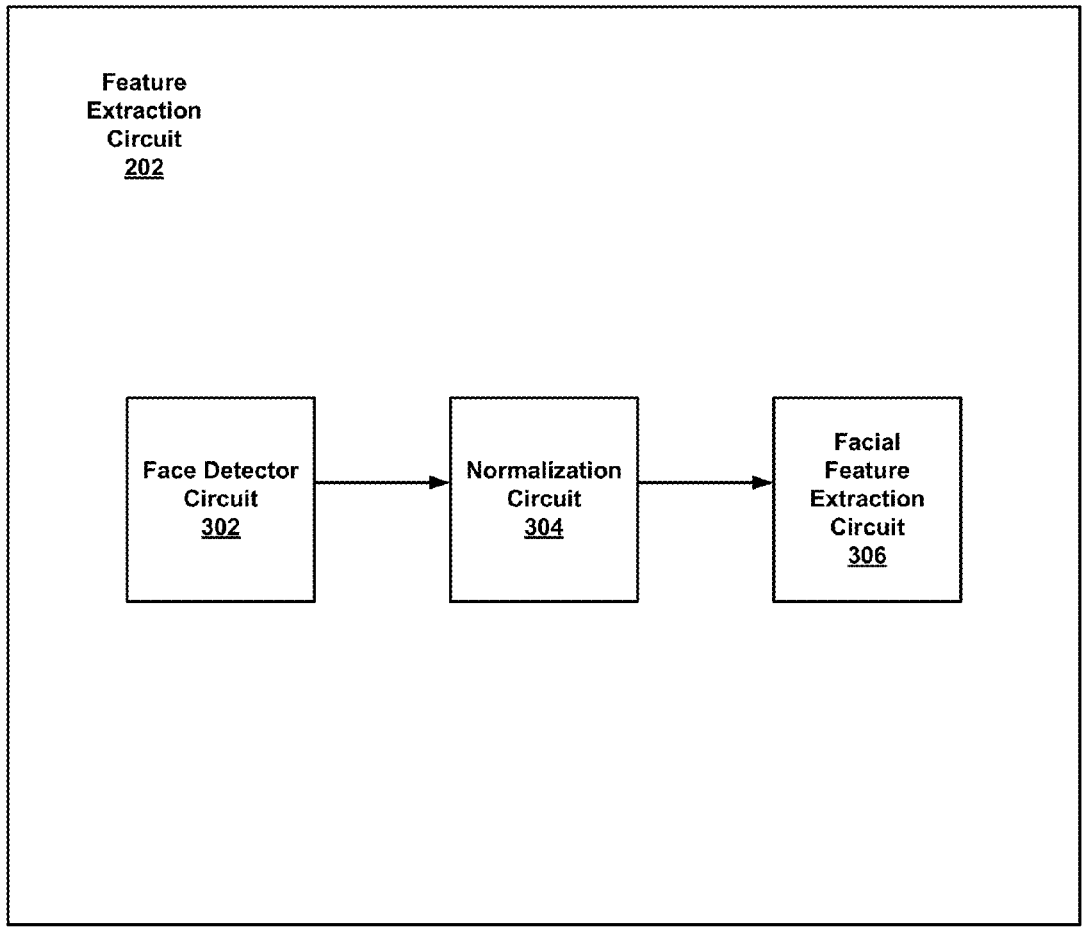
FIG. 3 is a block diagram of a feature extraction circuit, in accordance with certain of the embodiments disclosed herein.

FIG. 3 is a block diagram of a feature extraction circuit, in accordance with certain of the embodiments disclosed herein. The feature extraction circuit 202 is shown to include a face detector circuit 302, a normalization circuit 304 and a facial feature extraction circuit 306.

The face detector circuit 302 may be configured to detect the presence or absence of a face in the image. If a face is detected, the normalization circuit 304 may be configured to then adjust various properties of the image to map those properties into a common range. For example, the images may be resized so that all faces are of a similar size allowing for easier comparison. As another example, brightness and/or contrast may be adjusted to create a similar illumination effect for each image. The facial feature extraction circuit 306 may be configured to extract or estimate any of a number of desired facial features from the detected face. Facial features may include, for example, the relative position, size, shape, contours and/or texture, of facial components such as the eyes, nose, mouth, cheekbones, jawline, etc. In some embodiments, the feature extraction circuit 202 is implemented using known techniques in light of the present disclosure, such as a scale invariant feature transform (SIFT). Other techniques may also be used including, for example, Local Binary Pattern Classification (LBP), Modified Census Transformation (MCT), Principal Component Analysis (PCA), Speeded-Up Robust Feature Detection (SURF) or a Learning-Based Descriptor.

Figure 4A:
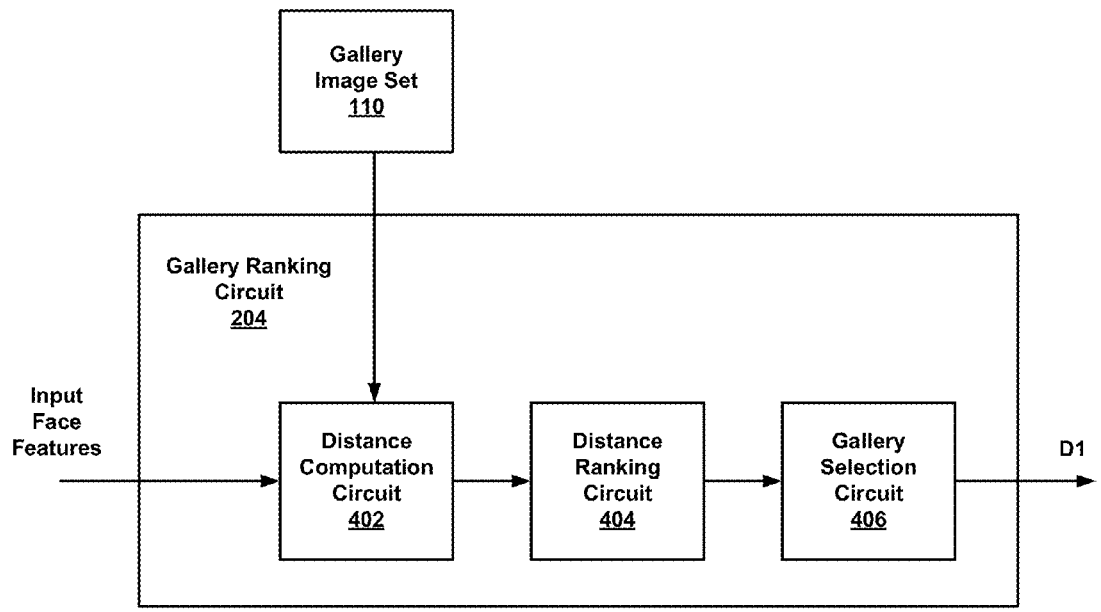
FIG. 4a is a block diagram of a gallery ranking circuit, in accordance with certain of the embodiments disclosed herein.

FIG. 4a is a block diagram of a gallery ranking circuit, in accordance with certain of the embodiments disclosed herein. The gallery ranking circuit 204 may be configured to search for a closest match between the input image 104 and the each of the images of the gallery image set 110. The gallery ranking circuit 204 is shown to include distance computation circuit 402, distance ranking circuit 404 and gallery selection circuit 406.

The distance computation circuit 402 may be configured to calculate distances between the features of the input face image and the corresponding features of each of the gallery images. For example, if there are K features to be evaluated in each image and there are M gallery images, then K distances can be calculated between each of the K features of the input image and each of the K features of each of the M gallery images. The K distances may be combined, for example using a weighted average or other suitable function, to generate a single distance metric, Gdist(j), for each input image/gallery image pairing, j=1,M. This may be expressed in equation form as follows:

$$Gdist(j)_{j=1,M} = \sum_{i=1,K} (w(i) \cdot [distfn(\text{input}(i), \text{gallery}(i, j))])$$

where w(i) represents the relative weight, or importance, of each of the K features; input(i) is feature i of the input image; and gallery(i,j) is feature i of the $j_{th}$ gallery image. In some embodiments, the distance function, distfn( ), may be based on Euclidean Distance, Manhattan Distance, Squared Euclidean Distance, Angel-Based Distance, Correlation Coefficient-Based Distance, Mahalanobis Distance or Chi-Squared Distance. Of course, this represents just one possible embodiment implementation for estimating the closeness of a match between an input image and a set of gallery images. Other known techniques in light of the present disclosure may be employed.

The distance ranking circuit 404 may be configured to rank, sort or otherwise search through the M Gdist values in order to find the minimum value which represents some measure of the distance between input image and the closest matching gallery image. The gallery selection circuit 406 may be configured to select that closest gallery image and save the distance which will be referred to herein as the first distance or D1. This may be expressed in equation form as:

$$D1 = \min(G\text{dist}(j))_{j=1,M}$$

Figure 4B:
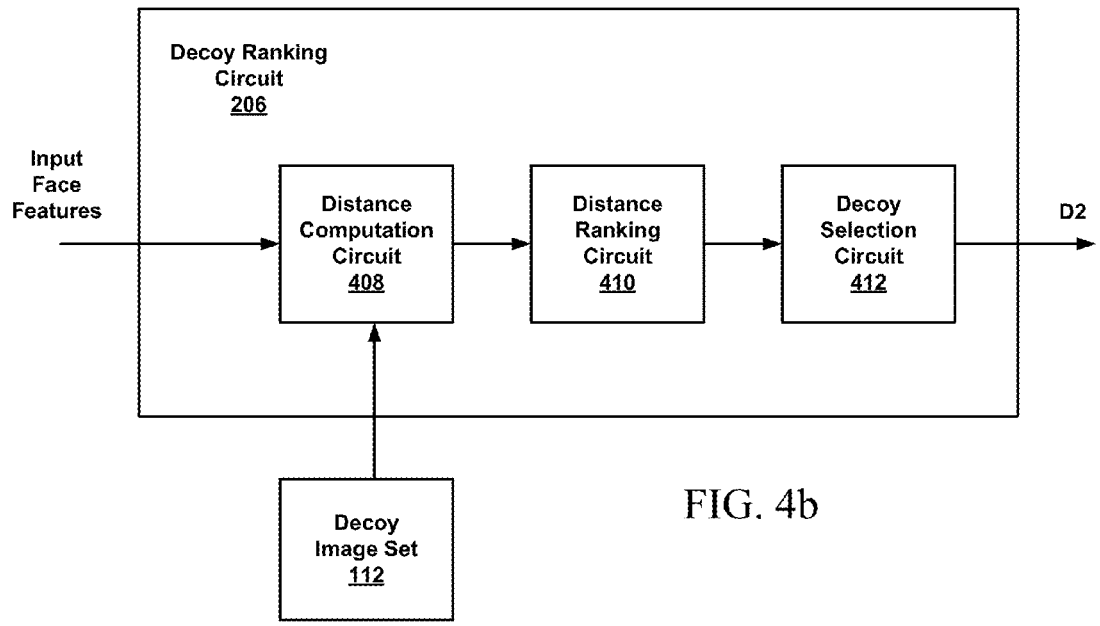
FIG. 4b is a block diagram of a decoy ranking circuit, in accordance with certain of the embodiments disclosed herein.

FIG. 4b is a block diagram of a decoy ranking circuit, in accordance with certain of the embodiments disclosed herein. The decoy ranking circuit 206 may be configured to search for a closest match between the input image 104 and the each of the decoy images of the decoy image set 112. The decoy ranking circuit 206 is shown to include distance computation circuit 408, distance ranking circuit 410 and decoy selection circuit 412, each of which function in a manner similar to the circuits described above with respect to the gallery ranking circuit 204, though operating on the decoy image set instead of the gallery image set.

In particular, the distance computation circuit 408 may be configured to calculate distances between the features of the input face image and the corresponding features of each of the decoy images. For example, if there are K features to be evaluated in each image and there are N decoy images, then K distances can be calculated between each of the K features of the input image and each of the K features of each of the N gallery images. The K distances may be combined, for example using a weighted average or other suitable function, to generate a single distance metric, Ddist(j), for each input image/decoy image pairing, j=1,N. This may be expressed in equation form as follows:

$$D\text{dist}(j)_{j=1,N} = \sum_{i=1,K} (w(i) \cdot [\text{dist}fn(\text{input}(i), \text{decoy}(i, j))])$$

where w(i) represents the relative weight, or importance, of each of the K features; input(i) is feature i of the input image; and decoy(i,j) is feature i of the $j_{th}$ decoy image. In some embodiments, the distance function, distfn( ), may be based on Euclidean Distance, Manhattan Distance, Squared Euclidean Distance, Angel-Based Distance, Correlation Coefficient-Based Distance, Mahalanobis Distance or Chi-Squared Distance. As previously stated, this represents just one possible embodiment implementation for estimating the closeness of a match. Other known techniques in light of the present disclosure may be employed.

The distance ranking circuit 410 may be configured to rank, sort or otherwise search through the N Ddist values in order to find the minimum value which represents some measure of the distance between input image and the closest decoy gallery image. The decoy selection circuit 412 may be configured to select that closest decoy image and save the distance which will be referred to herein as the second distance or D2. This may be expressed in equation form as:

$$D2 = \min(D\text{dist}(j))_{j=1,N}$$

Figure 5:
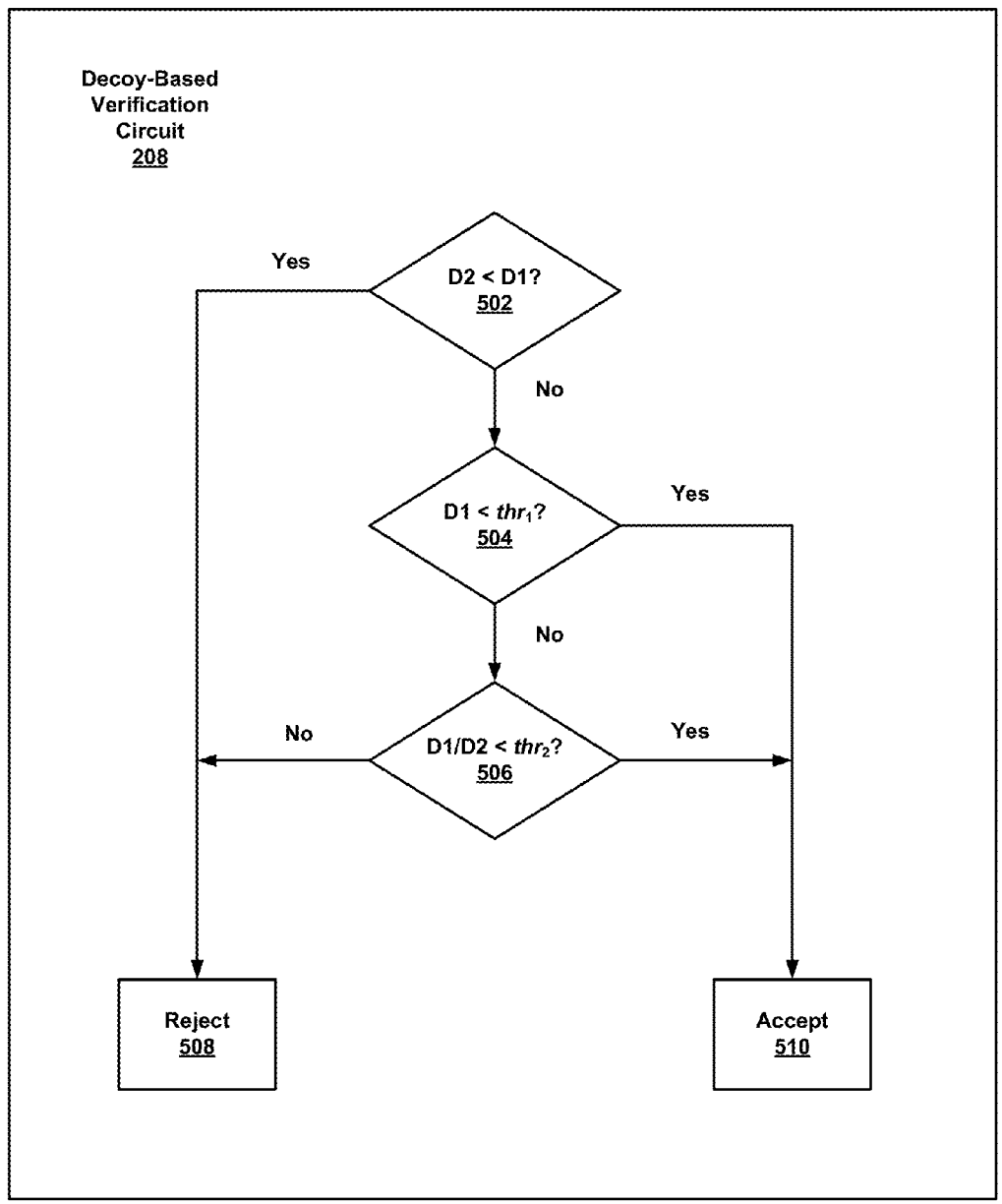
FIG. 5 is a block diagram of a decoy-based verification circuit, in accordance with certain of the embodiments disclosed herein.

FIG. 5 is a block diagram of a decoy-based verification circuit, in accordance with certain of the embodiments disclosed herein. The decoy-based verification circuit 208 may be configured to verify or validate that the closest gallery image, associated with distance D1, is a correct match, depending on the values of D1 and D2. For example, at operation 502, D1 and D2 are compared. If D2 is less than D1, the match is rejected (operation 508), since this would indicate that the input image is closer to a decoy image than a gallery image. This test can therefore reduce the rate of false matches. At operation 504, D1 is compared to a first selected threshold value $thr_1$. If D1 is less than the first threshold value, this indicates that the input image is close enough to the galley image, and the match is accepted at operation 510. If the test at operation 504 fails, however, indicating that the input image is not as close to the gallery image as would typically be desired for a match, an additional comparison is performed at operation 506. Here, the ratio of D1 to D2 (D1/D2) is compared to a second selected threshold value $thr_2$. If the ratio of the first distance to the second distance is less than the second threshold value, the match will be accepted because this indicates that the input image is relatively closer to the gallery image than the decoy image by a margin that is considered significant. The degree of "relative closeness" that is considered significant is determined by the selection of the second threshold value. This additional test can improve the rate of correct matches.

Figure 6:
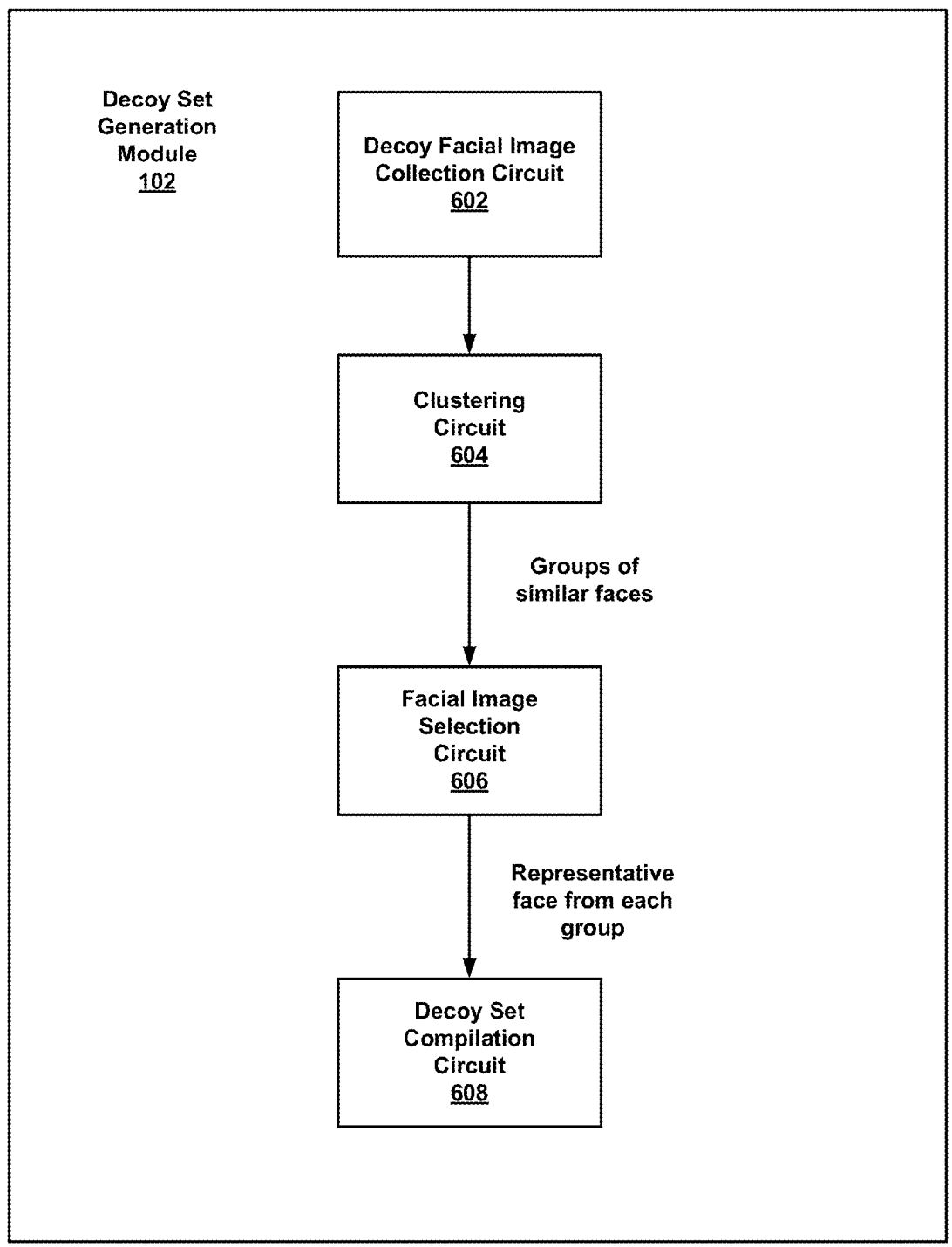
FIG. 6 is a block diagram of a decoy set generation module, configured in accordance with certain of the embodiments disclosed herein.

FIG. 6 is a block diagram of a decoy set generation module, configured in accordance with certain of the embodiments disclosed herein. The decoy set generation module 102 is configured to generate the decoy image set 112 and is shown to include a decoy facial image collection circuit 602, a clustering circuit 604, a facial image selection circuit 606 and a decoy set compilation circuit 608.

The decoy facial image collection circuit 602 may be configured to obtain images of faces or people that are not in the gallery image set 110. A relatively large number of such faces may be collected under a wide range of environmental conditions to create a representative sampling. The images may be collected using any suitable or convenient method. For example, they may be provided manually or gathered in an automatic or semi-automatic manner, such as through the use of web-crawling software that searches web sites for facial images. The clustering circuit 604 may be configured to divide the collected facial images into groups of similar faces through the use of a clustering algorithm. The clustering algorithm may be implemented using known techniques in light of the present disclosure.

The facial image selection circuit 606 may be configured to select a representative face from each group. For example, if there are K faces in each group, a K×K distance matrix may be computed to represent the distance between each possible pair of images in the group. Then, a representative face can be selected which has the minimum average distance to all other faces in that group. Of course, other suitable techniques may also be employed to select a representative face from each group. Decoy set compilation circuit 608 is configured to add or compile the selected representative faces into the decoy image set 112.

Figure 7:
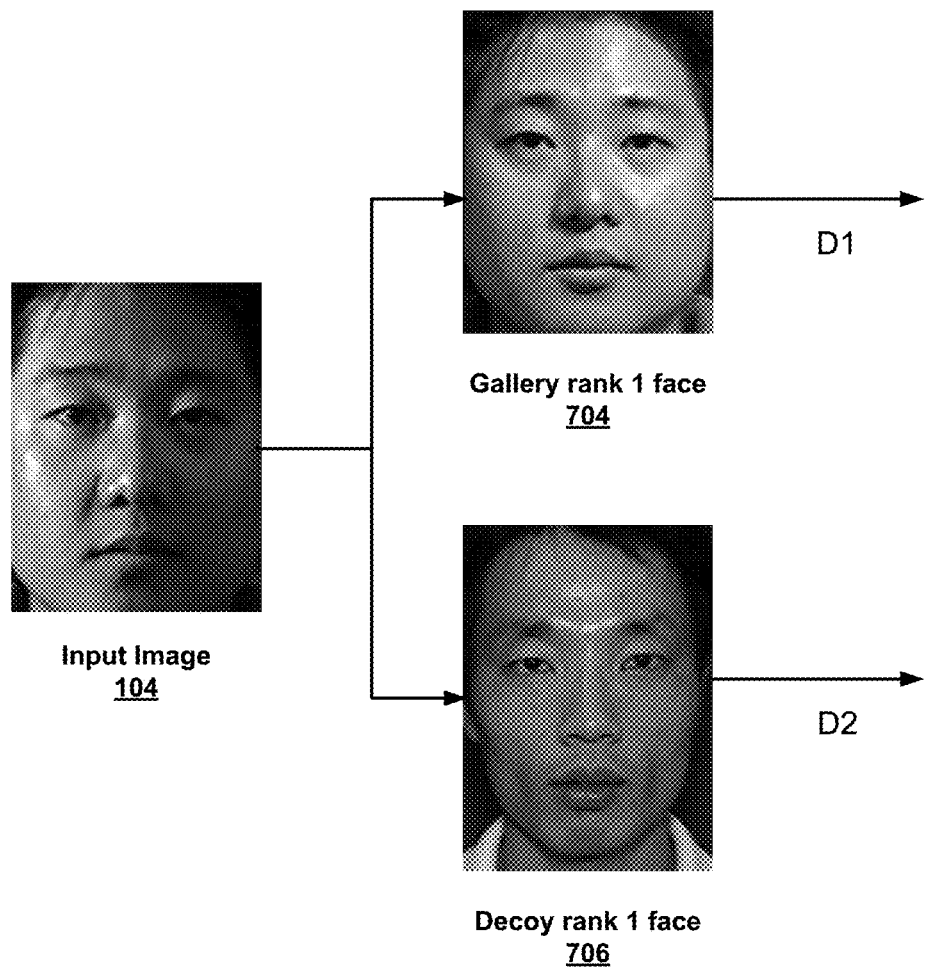
FIG. 7 illustrates example facial images processed in accordance with certain of the embodiments disclosed herein.

FIG. 7 illustrates example facial images processed in accordance with certain of the embodiments disclosed herein. For input image 104, the gallery ranking circuit 204 selected gallery rank 1 face 704 as the closest face from the gallery images. Decoy ranking circuit 206 selected decoy rank 1 face 706 as the closest face from the decoy images. Since the input image 104 and the gallery rank 1 face 704 were captured under different illumination conditions, their distance D1 does not satisfy the D1<$thr_1$ condition. The decoy-based verification circuit 208, however, compares the ratio of D1 and D2. In this case, the input image 104 and the decoy rank 1 face are significantly different, such that D2 is much greater than D1. As a result, therefore, it is determined that the input image face 104 does match the gallery rank 1 face 704.

Methodology

Figure 8:
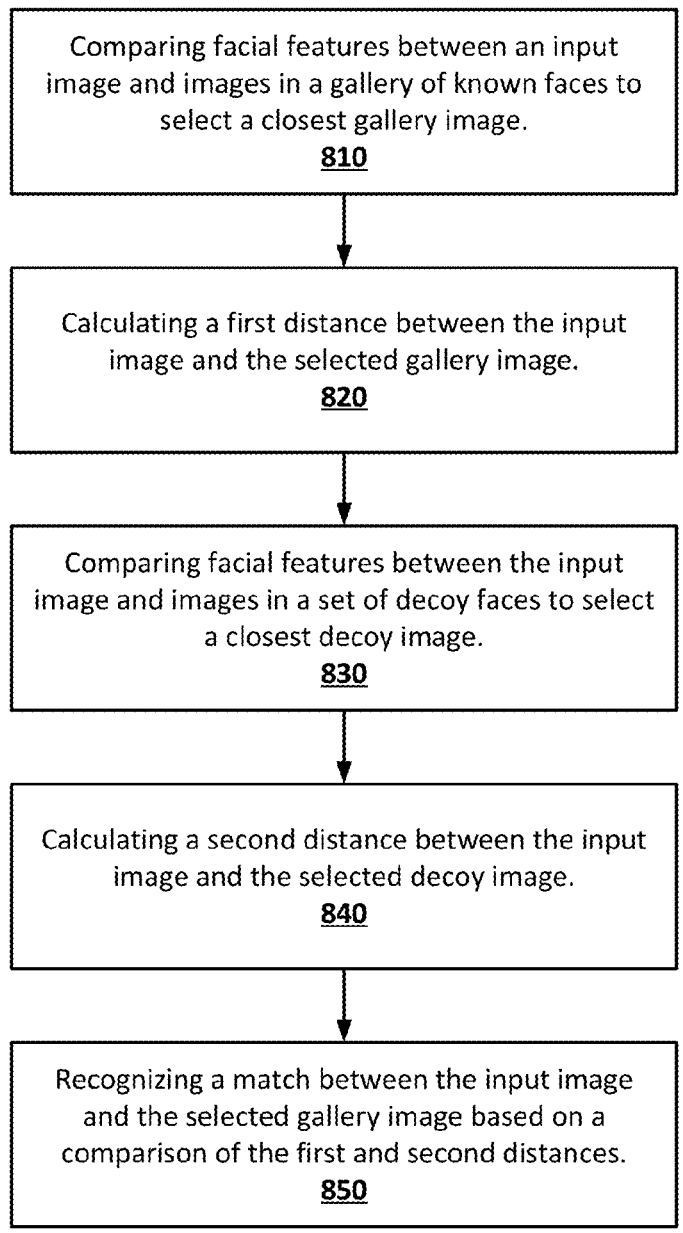
FIG. 8 is a flowchart illustrating a methodology for decoy-based matching, in accordance with certain of the embodiments disclosed herein.

FIG. 8 is a flowchart illustrating an example method 800 for facial recognition using decoy-based matching, in accordance with an embodiment of the present disclosure. As can be seen, example method 800 includes a number of phases and sub-processes, the sequence of which may vary from one embodiment to another. However, when considered in the aggregate, these phases and sub-processes form a process for facial recognition using decoy-based matching in accordance with certain of the embodiments disclosed herein. These embodiments can be implemented, for example using the system architecture illustrated in FIG. 3, as described above. However other system architectures can be used in other embodiments, as will be apparent in light of this disclosure. To this end, the correlation of the various functions shown in FIG. 8 to the specific components illustrated in FIG. 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 800. Thus other embodiments may have fewer or more modules and/or sub-modules depending on the granularity of implementation. Numerous variations and alternative configurations will be apparent in light of this disclosure.

As illustrated in FIG. 8, in one embodiment, method 800 for facial recognition using decoy-based matching commences by comparing, at operation 810, extracted facial features of an input image to facial features of known faces from a gallery of known faces. The input image is provided, for example, as a query to the facial recognition system to determine whether it matches one of the known faces in the gallery, and, if so, which face. Based on this comparison of features between the input image and each of the facial images in the gallery, a closest facial image from the gallery is selected. Next, at operation 820, a first distance metric is calculated between the input image and the selected closest gallery image.

At operation 830, extracted facial features of the input image are compared to facial features of images in a set of decoy faces. The images in the decoy set represent faces that are not part of the gallery of known faces and therefore should not be successfully matched to the input image for recognition. Based on this comparison of features between the input image and each of the decoy facial images, a closest facial image from the decoy set is selected. Then, at operation 840, a second distance metric is calculated between the input image and the selected closest decoy image.

At operation 850, a match may be recognized between the input image and the selected closest gallery image depending on the values of the first and second distance metrics. For example, if the second distance is less than the first distance, which would indicate that the input image is closer to a decoy image than a gallery image, the match is rejected. This test can reduce the rate of false matches. Otherwise, if the first distance is less than a first threshold value, indicating that the input image is close enough to the galley image, the match is accepted. However, according to some embodiments, even if the first distance exceeds the first threshold value, if the ratio of the first distance to the second distance is less than a second threshold value, the match will be accepted because this indicates that the input image is relatively closer to the gallery image than the decoy image by a margin that is considered significant (e.g., based on the selection of the second threshold value). This condition can improve the rate of correct matches.

Of course, in some embodiments, additional operations may be performed, as previously described in connection with the system. These additional operations may include, for example, generating the set of decoy faces by collecting decoy facial images and clustering the decoy facial images into groups of similar faces based on distance metrics between the facial features associated with each decoy face. A representative face from each group may then be selected for compilation into the decoy set.

Example System

Figure 9:
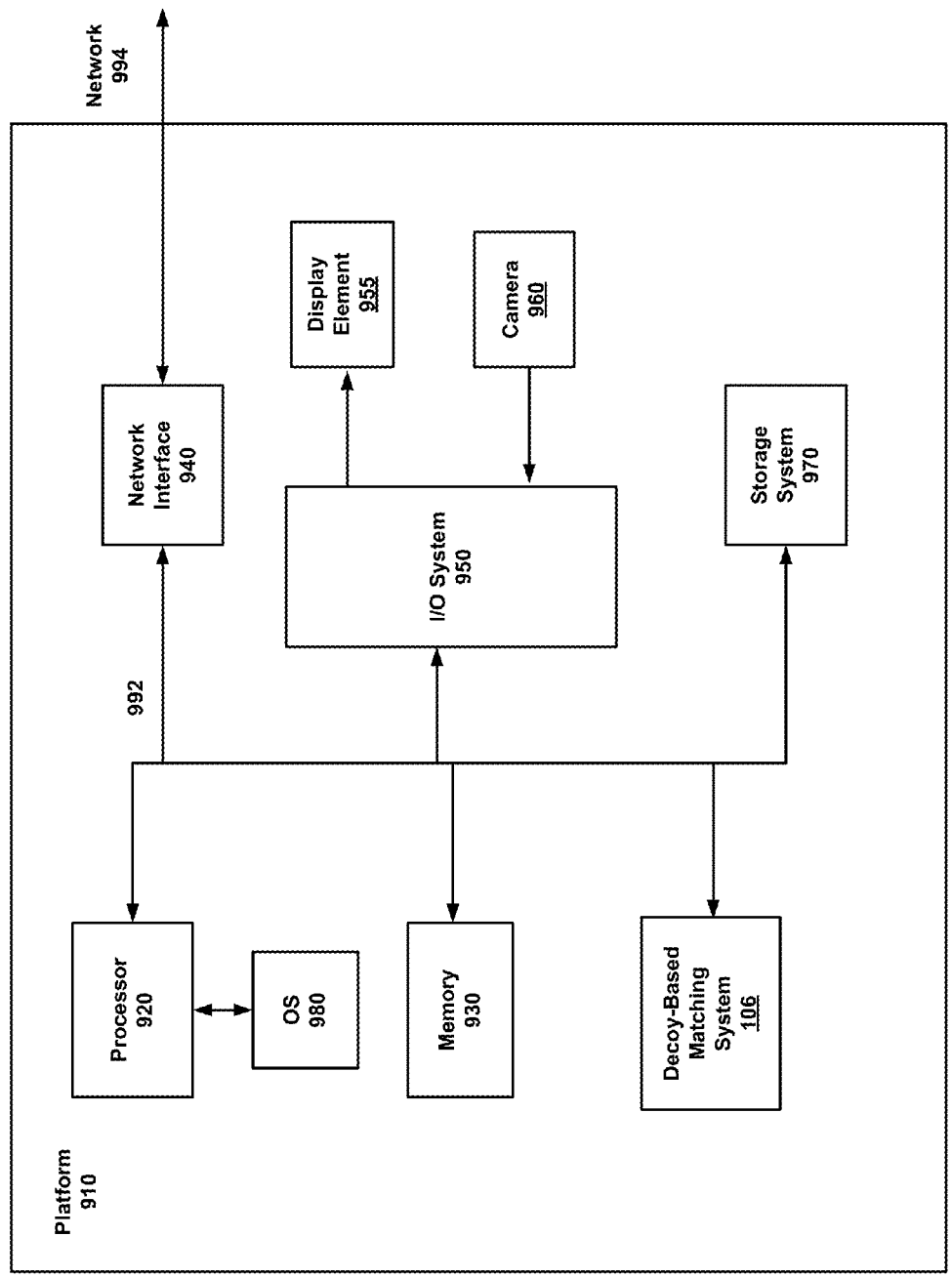
FIG. 9 is a block diagram schematically illustrating a system platform to perform decoy-based matching, configured in accordance with certain of the embodiments disclosed herein.

FIG. 9 illustrates an example system 900 that may be configured facial recognition using decoy-based matching, as described herein. In some embodiments, system 900 comprises a platform 910 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 910 may comprise any combination of a processor 920, a memory 930, a decoy-based matching system 106, camera 960, a network interface 940, an input/output (I/O) system 950, a display element 955, and a storage system 970. As can be further seen, a bus and/or interconnect 992 is also provided to allow for communication between the various components listed above and/or other components not shown. Platform 910 can be coupled to a network 994 through network interface 940 to allow for communications with other computing devices, platforms or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor or a graphics processing unit, to assist in control and processing operations associated with system 900. In some embodiments, the processor 920 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 900, and therefore may also be implemented using any suitable existing or subsequently-developed platform.

Network interface module 940 can be any appropriate network chip or chipset which allows for wired and/or wireless connection between other components of computer system 900 and/or network 994, thereby enabling system 900 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of computer system 900. I/O devices may include, but not be limited to, a display element 955, camera 960, and other devices not shown such as a keyboard, mouse, speaker, microphone, etc.

I/O system 950 may include a graphics subsystem configured to perform processing of images for display element 955. Graphics subsystem may be a graphics processing unit or a visual processing unit (VPU), for example. An analog or digital interface may be used to communicatively couple graphics subsystem and display element 955. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 920 or any chipset of platform 910. In some embodiments, display element 955 may comprise any television type monitor or display, including liquid crystal displays (LCDs) and light emitting diode displays (LEDs). Display element 955 may comprise, for example, a computer display screen, touchscreen display, video monitor, television-like device, and/or a television. Display element 955 may be digital and/or analog. Under the control of the OS 980 (or one or more software applications), platform 910 may display processed images on display element 955, such as, for example, a recognized face from the gallery of known faces that is matched to the input facial image. The images may be provided by decoy-based matching system 106. Camera 960 may be configured to provide input facial images upon which the recognition techniques described herein may be performed.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Decoy-based matching system 106 is configured to match an input facial image to a facial image from a gallery of known faces. The matching is based on estimated similarities between the input image and the gallery images as well as estimated similarities between the input image and decoy images. Decoy-based matching system 106 may include any or all of the components illustrated in FIG. 3 and described above. Decoy-based matching system 106 can be implemented or otherwise used in conjunction with a variety of suitable software and/or hardware that is coupled to or that otherwise forms a part of system 900. Decoy-based matching system 106 can additionally or alternatively be implemented or otherwise used in conjunction with user I/O devices that are capable of providing information to, and receiving information and commands from, a user. These I/O devices may include display element 955, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments decoy-based matching system 106 may be installed local to system 900, as shown in the example embodiment of FIG. 9. Alternatively, system 900 can be implemented in a client-server arrangement (or local and cloud based arrangement) wherein at least some functionality associated with decoy-based matching system 106 is provided to system 900 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 994 or remotely coupled to network 994 by one or more other networks and/or communication channels. In some cases access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for decoy-based matching, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, decoy-based matching system 106 may operate by leveraging processing resources provided by a remote computer system accessible via network 994. In other embodiments the functionalities disclosed herein can be incorporated into other software applications, such as image management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for facial recognition. The method comprises: comparing extracted facial features of an input image, provided for recognition, to facial features of each of one or more images in a gallery of known faces, to select a closest gallery image; calculating a first distance between the input image and the selected gallery image; comparing the facial features of the input image to facial features of each of one or more images in a set of decoy faces, to select a closest decoy image; calculating a second distance between the input image and the selected decoy image; and recognizing a match between the input image and the selected gallery image based on a comparison of the first distance and the second distance.

Example 2 includes the subject matter of Example 1, wherein the selecting of the closest gallery image further comprises searching for a minimum distance between facial features of the input image and facial features of each of the one or more gallery images; and the selecting of the closest decoy image further comprises searching for a minimum distance between facial features of the input image and facial features of each of the one or more decoy images.

Example 3 includes the subject matter of Examples 1 and 2, wherein the recognizing further comprises rejecting the match if the second distance is less than the first distance.

Example 4 includes the subject matter of Examples 1-3, wherein the recognizing further comprises accepting the match if the first distance is less than a first selected threshold value.

Example 5 includes the subject matter of Examples 1-4, wherein the recognizing further comprises accepting the match if a ratio of the first distance to the second distance is less than a second selected threshold value, even if the first distance is greater than the first selected threshold value.

Example 6 includes the subject matter of Examples 1-5, further comprising generating the set of decoy faces by: collecting decoy facial images; clustering the decoy facial images into groups of similar faces based on distances between facial features associated with the decoy faces; selecting a representative face from each the groups; and compiling the representative faces into the set of decoy faces.

Example 7 includes the subject matter of Examples 1-6, wherein the facial features of the input image are extracted based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

Example 8 includes the subject matter of Examples 1-7, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

Example 9 is a system for facial recognition. The system comprises: a feature extraction circuit to extract facial features of an input image provided for recognition; a gallery ranking circuit to compare the extracted facial features of the input image to facial features of each of one or more images in a gallery of known faces, to select a closest gallery image; and to calculate a first distance between the input image and the selected gallery image; a decoy ranking circuit to compare the extracted facial features of the input image to facial features of each of one or more images in a set of decoy faces, to select a closest decoy image; and to calculate a second distance between the input image and the selected decoy image; and a verification circuit to verify a match between the input image and the selected gallery image based on a comparison of the first distance and the second distance.

Example 10 includes the subject matter of Example 9, wherein the gallery ranking circuit is further to select the closest gallery image based on a search for a minimum distance between facial features of the input image and facial features of each of the one or more gallery images; and the decoy ranking circuit is further to select the closest decoy image based on a search for a minimum distance between facial features of the input image and facial features of each of the one or more decoy images.

Example 11 includes the subject matter of Examples 9 and 10, wherein the verification circuit is further to reject the match if second distance is less than the first distance.

Example 12 includes the subject matter of Examples 9-11, wherein the verification circuit is further to verify the match if the first distance is less than a first selected threshold value.

Example 13 includes the subject matter of Examples 9-12, wherein the verification circuit is further to verify the match if a ratio of the first distance to the second distance is less than a second selected threshold value, even if the first distance is greater than the first selected threshold value.

Example 14 includes the subject matter of Examples 9-13, further comprising a decoy set generation module to: collect decoy facial images; cluster the decoy facial images into groups of similar faces based on distances between facial features associated with the decoy faces; select a representative face from each the groups; and compile the representative faces into the set of decoy faces.

Example 15 includes the subject matter of Examples 9-14, wherein the feature extraction circuit is further to extract facial features of the input image based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

Example 16 includes the subject matter of Examples 9-15, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

Example 17 is at least one non-transitory computer readable storage medium having instructions encoded thereon that, when executed by one or more processors, result in the following operations for facial recognition, the operations comprising: comparing extracted facial features of an input image, provided for recognition, to facial features of each of one or more images in a gallery of known faces, to select a closest gallery image; calculating a first distance between the input image and the selected gallery image; comparing the facial features of the input image to facial features of each of one or more images in a set of decoy faces, to select a closest decoy image; calculating a second distance between the input image and the selected decoy image; and recognizing a match between the input image and the selected gallery image based on a comparison of the first distance and the second distance.

Example 18 includes the subject matter of Example 17, wherein the selecting of the closest gallery image further comprises searching for a minimum distance between facial features of the input image and facial features of each of the one or more gallery images; and the selecting of the closest decoy image further comprises searching for a minimum distance between facial features of the input image and facial features of each of the one or more decoy images.

Example 19 includes the subject matter of Examples 17 and 18, wherein the recognizing further comprises rejecting the match if the second distance is less than the first distance.

Example 20 includes the subject matter of Examples 17-19, wherein the recognizing further comprises accepting the match if the first distance is less than a first selected threshold value.

Example 21 includes the subject matter of Examples 17-20, wherein the recognizing further comprises accepting the match if a ratio of the first distance to the second distance is less than a second selected threshold value, even if the first distance is greater than the first selected threshold value.

Example 22 includes the subject matter of Examples 17-21, further comprising generating the set of decoy faces by: collecting decoy facial images; clustering the decoy facial images into groups of similar faces based on distances between facial features associated with the decoy faces; selecting a representative face from each the groups; and compiling the representative faces into the set of decoy faces.

Example 23 includes the subject matter of Examples 17-22, wherein the facial features of the input image are extracted based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

Example 24 includes the subject matter of Examples 17-23, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

Example 25 is a system for facial recognition. The system comprises: means for comparing extracted facial features of an input image, provided for recognition, to facial features of each of one or more images in a gallery of known faces, to select a closest gallery image; means for calculating a first distance between the input image and the selected gallery image; means for comparing the facial features of the input image to facial features of each of one or more images in a set of decoy faces, to select a closest decoy image; means for calculating a second distance between the input image and the selected decoy image; and means for recognizing a match between the input image and the selected gallery image based on a comparison of the first distance and the second distance.

Example 26 includes the subject matter of Example 25, wherein the selecting of the closest gallery image further comprises means for searching for a minimum distance between facial features of the input image and facial features of each of the one or more gallery images; and the selecting of the closest decoy image further comprises means for searching for a minimum distance between facial features of the input image and facial features of each of the one or more decoy images.

Example 27 includes the subject matter of Examples 25 and 26, wherein the recognizing further comprises means for rejecting the match if the second distance is less than the first distance.

Example 28 includes the subject matter of Examples 25-27, wherein the recognizing further comprises means for accepting the match if the first distance is less than a first selected threshold value.

Example 29 includes the subject matter of Examples 25-28, wherein the recognizing further comprises means for accepting the match if a ratio of the first distance to the second distance is less than a second selected threshold value, even if the first distance is greater than the first selected threshold value.

Example 30 includes the subject matter of Examples 25-29, further comprising means for generating the set of decoy faces by: collecting decoy facial images; clustering the decoy facial images into groups of similar faces based on distances between facial features associated with the decoy faces; selecting a representative face from each the groups; and compiling the representative faces into the set of decoy faces.

Example 31 includes the subject matter of Examples 25-30, wherein the facial features of the input image are extracted based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

Example 32 includes the subject matter of Examples 25-31, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for facial recognition, the method comprising:
    comparing, by a processor, extracted facial features of an input image, provided for recognition, to facial features of each of one or more images in a gallery of known faces, to select a closest gallery image, wherein the known faces are associated with potential recognition matches to the input image;
    calculating, by the processor, a first distance between the input image and the selected gallery image;
    comparing, by the processor, the facial features of the input image to facial features of each of one or more images in a set of decoy faces, to select a closest decoy image, wherein the decoy faces are associated with persons that should not generate recognition matches to the input image;
    calculating, by the processor, a second distance between the input image and the selected decoy image; and
    recognizing, by the processor, a match between the input image and the selected gallery image based on a comparison of the first distance and the second distance, wherein the recognizing includes
        rejecting the match if the second distance is less than the first distance,
        accepting the match if the first distance is less than a first selected threshold value, and
        accepting the match if a ratio of the first distance to the second distance is less than a second selected threshold value, even if the first distance is greater than the first selected threshold value.

2. The method of claim 1, wherein the selecting of the closest gallery image further comprises searching for a minimum distance between facial features of the input image and facial features of each of the one or more gallery images; and the selecting of the closest decoy image further comprises searching for a minimum distance between facial features of the input image and facial features of each of the one or more decoy images.

3. The method of claim 1, further comprising generating the set of decoy faces by:
    collecting decoy facial images;
    clustering the decoy facial images into groups of similar faces based on distances between facial features associated with the decoy faces;
    selecting a representative face from each the groups; and
    compiling the representative faces into the set of decoy faces.

4. The method of claim 1, wherein the facial features of the input image are extracted based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

5. The method of claim 1, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

6. A system for facial recognition, the system comprising:
    a feature extraction circuit to extract facial features of an input image provided for recognition;
    a gallery ranking circuit to compare the extracted facial features of the input image to facial features of each of one or more images in a gallery of known faces, to select a closest gallery image, wherein the known faces are associated with potential recognition matches to the input image; and to calculate a first distance between the input image and the selected gallery image;
    a decoy ranking circuit to compare the extracted facial features of the input image to facial features of each of one or more images in a set of decoy faces, to select a closest decoy image, wherein the decoy faces are associated with persons that should not generate recognition matches to the input image; and to calculate a second distance between the input image and the selected decoy image; and
    a verification circuit to verify a match between the input image and the selected gallery image based on a comparison of the first distance and the second distance, wherein the verification includes
        rejecting the match if second distance is less than the first distance,
        verifying the match if the first distance is less than a first selected threshold value, and
        verifying the match if a ratio of the first distance to the second distance is less than a second selected threshold value, even if the first distance is greater than the first selected threshold value.

7. The system of claim 6, wherein the gallery ranking circuit is further to select the closest gallery image based on a search for a minimum distance between facial features of the input image and facial features of each of the one or more gallery images; and the decoy ranking circuit is further to select the closest decoy image based on a search for a minimum distance between facial features of the input image and facial features of each of the one or more decoy images.

8. The system of claim 6, further comprising a decoy set generation module to:
    collect decoy facial images;
    cluster the decoy facial images into groups of similar faces based on distances between facial features associated with the decoy faces;
    select a representative face from each the groups; and
    compile the representative faces into the set of decoy faces.

9. The system of claim 6, wherein the feature extraction circuit is further to extract facial features of the input image based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

10. The system of claim 6, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

11. At least one non-transitory computer readable storage medium having instructions encoded thereon that, when executed by one or more processors, result in the following operations for facial recognition, the operations comprising:
   comparing extracted facial features of an input image, provided for recognition, to facial features of each of one or more images in a gallery of known faces, to select a closest gallery image, wherein the known faces are associated with potential recognition matches to the input image;
   calculating a first distance between the input image and the selected gallery image;
   comparing the facial features of the input image to facial features of each of one or more images in a set of decoy faces, to select a closest decoy image, wherein the decoy faces are associated with persons that should not generate recognition matches to the input image;
   calculating a second distance between the input image and the selected decoy image; and
   recognizing a match between the input image and the selected gallery image based on a comparison of the first distance and the second distance, wherein the recognizing includes
      rejecting the match if the second distance is less than the first distance,
      accepting the match if the first distance is less than a first selected threshold value, and
      accepting the match if a ratio of the first distance to the second distance is less than a second selected threshold value, even if the first distance is greater than the first selected threshold value.

12. The computer readable storage medium of claim 11, wherein the selecting of the closest gallery image further comprises searching for a minimum distance between facial features of the input image and facial features of each of the one or more gallery images; and the selecting of the closest decoy image further comprises searching for a minimum distance between facial features of the input image and facial features of each of the one or more decoy images.

13. The computer readable storage medium of claim 11, further comprising generating the set of decoy faces by:
   collecting decoy facial images;
   clustering the decoy facial images into groups of similar faces based on distances between facial features associated with the decoy faces;
   selecting a representative face from each the groups; and
   compiling the representative faces into the set of decoy faces.

14. The computer readable storage medium of claim 11, wherein the facial features of the input image are extracted based on at least one of Local Binary Pattern Classification (LBP), Modified Census Transformation (MCT), Principal Component Analysis (PCA), Shift Invariant Feature Transformation (SIFT), Speeded Up Robust Feature Detection (SURF) or a Learning-Based Descriptor.

15. The computer readable storage medium of claim 11, wherein the calculations of the first distance and the second distance are based on at least one of Euclidean Distance, Manhattan Distance, Squared Euclidean Distance, Angel-Based Distance, Correlation Coefficient-Based Distance, Mahalanobis Distance or Chi-Squared Distance.

* * * * *